United States Patent
Jian

(10) Patent No.: US 9,661,315 B2
(45) Date of Patent: May 23, 2017

(54) METHOD AND APPARATUS FOR 2D/3D SWITCHABLE DISPLAYING

(71) Applicant: SUPERD CO. LTD, Shenzhen, Guangdong (CN)

(72) Inventor: Peiyun Jian, Guangdong (CN)

(73) Assignee: SUPERD CO. LTD, Shenzhen, Guangdong (CN)

( * ) Notice: Subject to any disclaimer, the term of this patent is extended or adjusted under 35 U.S.C. 154(b) by 454 days.

(21) Appl. No.: 14/528,937

(22) Filed: Oct. 30, 2014

(65) Prior Publication Data

US 2015/0124061 A1    May 7, 2015

(30) Foreign Application Priority Data

Nov. 1, 2013 (CN) .......................... 2013 1 0535892

(51) Int. Cl.
*H04N 13/04* (2006.01)
*H04N 13/00* (2006.01)

(52) U.S. Cl.
CPC ..... *H04N 13/0454* (2013.01); *H04N 13/0018* (2013.01); *H04N 13/0022* (2013.01); *H04N 13/0402* (2013.01); *H04N 13/0404* (2013.01); *H04N 13/0456* (2013.01); *H04N 13/0497* (2013.01)

(58) Field of Classification Search
CPC ........... H04N 13/0454; H04N 13/0402; H04N 13/0456
See application file for complete search history.

(56) References Cited

U.S. PATENT DOCUMENTS

| 2006/0139448 | A1* | 6/2006 | Ha ..................... | H04N 13/0404 348/51 |
| 2009/0103833 | A1 | 4/2009 | Mitsuhashi | |
| 2013/0016189 | A1* | 1/2013 | Hosaka ............. | H04N 13/0239 348/49 |

FOREIGN PATENT DOCUMENTS

| CN | 102404599 A | 4/2012 |
| CN | 2013105358920 | 11/2015 |
| JP | 2014-224166 | 2/2017 |

* cited by examiner

*Primary Examiner* — Shawn An
(74) *Attorney, Agent, or Firm* — Andrew C. Cheng

(57) ABSTRACT

A method for 2D/3D switchable displaying includes: real-time detecting a 3D display area; when a change of the 3D display area is detected, calculating a gradient coefficient based on a number of frame of change and a rate of the change of the 3D display area; adjusting a 3D image area and a 3D grating area based on the calculated gradient coefficient; and performing a stereoscopic display by the adjusted 3D image area and the adjusted 3D grating area. When the 3D display area starts a change and ends the change, the 3D display area gradually is switched to be 2D display and switched to be 3D display respectively, so that a gradient visual effect is achieved, and the problems of viewing image jitter and 3D effect mistake caused by pixel arrangement and hardware control in the 3D display area being not synchronized can be avoided.

20 Claims, 6 Drawing Sheets

METHOD AND APPARATUS FOR 2D/3D SWITCHABLE DISPLAYING

TECHNICAL FIELD

The present invention relates to the field of stereoscopic display technology, and particularly to a method and an apparatus for 2D/3D (two-dimensional/three-dimensional) switchable displaying.

DESCRIPTION OF RELATED ART

In a conventional autostereoscopic display system, it is achieved that simultaneously displays 2D and 3D images regionally, i.e., some of display area is 3D image display while another some of display area is 2D image display. However, when a shape or a position of the 3D display area changes, a continuous jitter of viewing images in the 3D display area would occur, and the 3D display effect is degraded consequently.

SUMMARY

Accordingly, an objective of the present invention is to provide a method and an apparatus for 2D/3D switchable displaying, which can prevent the problem of degraded 3D display effect of continuous image jitter resulting from pixel arrangement and hardware control in the 3D display area being not synchronized.

In order to achieve the above objectives, the present invention provides a method for 2D/3D switchable displaying. The method includes: real-time detecting a 3D display area; when a change of the 3D display area is detected, calculating a gradient coefficient based on a number of frame of change and a rate of change of the 3D display area; adjusting a 3D image area and a 3D grating area based on the calculated gradient coefficient; and performing a stereoscopic display on the adjusted 3D image area and the adjusted 3D grating area.

Preferably, when the 3D display area starts the change, the gradient coefficient $\omega 1$ is:

$$\omega 1 = \begin{cases} \dfrac{a}{t} + \dfrac{b}{s} & t < T \\ 0 & t \geq T \end{cases}$$

where t represents a number of frame for calculating when the 3D display area starts the change, T is a threshold of the number of frame, s is a rate of change of the 3D display area, and a and b are weighting factors; and when the 3D display area ends the change, the gradient coefficient $\omega 2$ is:

$$\omega 2 = \begin{cases} \dfrac{a}{T-t} + \dfrac{b}{s} & t < T \\ 1 & t \geq T \end{cases}$$

where t represents a number of frame for calculating when the 3D display area ends the change, T is a threshold of the number of frame, s is a rate of change of the 3D display area, and a and b are weighting factors.

Preferably, the step of adjusting a 3D image area and a 3D grating area based on the calculated gradient coefficient includes:

in each frame of preset number of frames, adjusting a color intensity of viewing images of the 3D image area based on the calculated gradient coefficient; performing an image unit arranging of sub-pixel level on the adjusted viewing images; and adjusting the 3D grating area based on the calculated gradient coefficient.

Preferably, the step of adjusting a color intensity of viewing images of the 3D image area includes:

maintaining the color of one of the viewing images unchanged, and multiplying the color of the other of the viewing images by the calculated gradient coefficient.

Preferably, the step of adjusting a 3D image area and a 3D grating area based on the calculated gradient coefficient includes:

in each frame of preset number of frames, adjusting a parallax between viewing images of the 3D image area based on the calculated gradient coefficient; performing an image unit arranging of sub-pixel level on the adjusted viewing images; and adjusting the 3D grating area based on the calculated gradient coefficient.

Preferably, the step of adjusting a parallax between viewing images of the 3D image area includes:

determining one of the viewing images as a base viewing image;

obtaining parallax information between the other of the viewing images and the base viewing image; and multiplying parallax value of each pixel of the other of the viewing images by the calculated gradient coefficient as an offset of the pixel to thereby generate new viewing images, the generated new viewing images and the base viewing image constituting the 3D image area for stereoscopic display.

Preferably, the step of obtaining parallax information between the other of the viewing images and the base viewing image includes:

using a graphics application program interface (API) to obtain a scene depth map, and converting depth information into the parallax information based on a rendering context.

Preferably, the step of obtaining parallax information between the other of the viewing images and the base viewing image includes:

calculating the parallax information between the base viewing image and the other of the viewing images by a stereo matching algorithm.

Preferably, the method further includes a step of performing a gradual switching between 2D display and 3D display by pixel-to-pixel control. For example, when the 3D display area starts the change, the 3D display area is gradually switched to 2D display; and when the 3D display area ends the change, the 3D display area gradually returns to 3D display.

Preferably, when the change of the 3D display area is detected, calculating different gradient coefficients corresponding to the start of change of the 3D display area and the end of change of the 3D display area, respectively.

Preferably, the gradient coefficients corresponding to the start of change of the 3D display area and the end of change of the 3D display area respectively are different from each other.

In another aspect, the present invention further provides an apparatus for 2D/3D switchable displaying, at least including:

a detection module configured (i.e., structured and arranged) to detect a real-time change of a 3D display area;

a calculation module configured to calculate a gradient coefficient based on a number of frame of change and a rate of change of the 3D display area when a change of the 3D display area is detected;

an adjustment module configured to adjust a 3D image area and a 3D grating area based on the calculated gradient coefficient; and a display module configured to perform a stereoscopic display on the adjusted 3D image area and the adjusted 3D grating area.

Preferably, the calculation module is configured to:

when the 3D display area starts the change, calculate the gradient coefficient ω1 according to the expression:

$$\omega 1 = \begin{cases} \dfrac{a}{t} + \dfrac{b}{s} & t < T \\ 0 & t \geq T \end{cases}$$

where t is a number of frame for calculating when the 3D display area starts the change, T is a threshold of the number of frame, s is a rate of change of the 3D display area, and a and b are weighting factors; and when the 3D display area ends the change, calculate the gradient coefficient ω2 according to the expression:

$$\omega 2 = \begin{cases} \dfrac{a}{T-t} + \dfrac{b}{s} & t < T \\ 1 & t \geq T \end{cases}$$

where t is a number of frame for calculating when the 3D display area ends the change, T is a threshold of the number of frame, s is a rate of change of the 3D display area, and a and b are weighting factors.

Preferably, the adjustment module is configured to:

in each frame of preset number of frames, adjust a color intensity of viewing images of the 3D image area based on the calculated gradient coefficient; perform an image unit arrangement of sub-pixel level on the adjusted viewing images; and adjust the 3D grating area based on the calculated gradient coefficient.

Preferably, the adjustment module is configured to:

in each frame of preset number of frames, adjust a parallax between viewing images of the 3D image area based on the calculated gradient coefficient; perform an image unit arrangement of sub-pixel level on the adjusted viewing images; and adjust the 3D grating area based on the calculated gradient coefficient.

Preferably, the adjustment module adjusts the parallax between the viewing images of the 3D image area includes:

determining one of the viewing images as a base viewing image;

calculating the parallax information between the other of the viewing images and the base viewing image; and multiplying a parallax value of each pixel of the other of the viewing images by the calculated gradient coefficient as an offset of the pixel to thereby generate another viewing image, the generated another viewing image and the base viewing image constituting the 3D image area for stereoscopic display.

Preferably, in the apparatus, the 3D display area is gradually switchable between 2D display and 3D display by pixel-to-pixel control. For example, when the 3D display area starts the change, the 3D display area is gradually switched to 2D display; and when the 3D display area ends the change, the 3D display area gradually returns to 3D display.

Preferably, in the apparatus, when the change of the 3D display area is detected, the calculation module calculates different gradient coefficients corresponding to the start of change of the 3D display area and the end of change of the 3D display area, respectively.

In the above various embodiments of the present invention, when the 3D display area starts a change, the 3D display area gradually is switched to be 2D display, and when the 3D display area ends the change, the display area gradually is switched to be 3D display; so that a gradient visual effect can be achieved when the change of the 3D display area occurs, and the problems of viewing image jitter and 3D effect mistake caused by pixel arrangement and hardware control of 3D display area being not synchronized can be avoided consequently.

BRIEF DESCRIPTION OF THE DRAWINGS

Drawings in embodiments of the present invention will be given a brief description below, and the drawings in the embodiments are used to further understand the present invention and together with the specification serve to explain the present invention, and are not to be construed as limiting the scope of the present invention.

DETAILED DESCRIPTION OF EMBODIMENTS

The present invention will now be described more specifically with reference to the following embodiments. It is noted that the following descriptions of embodiments are presented herein for purpose of illustration and description only. It is not intended to be exhaustive or to be limited to the precise form disclosed.

As well-known, the real world is stereoscopic, the stereoscopic vision then is generated when the left eye and the right eye of the viewer receive images at different angles, which are further combined by the brain, such that the viewer can sense the layering and depth perception of objects for 3D display. Based on this principle, by three-dimensional (3D) display apparatuses providing the left-eye image and the right-eye image with parallax therebetween (with different eyepoints) respectively to the left eye and the right eye of the viewer, a 3D effect can be achieved.

The autostereoscopic display technology is that the viewer does not need to wear any auxiliary device such as glasses or helmet, etc. and can see the stereoscopic images. The autostereoscopic technology can be primarily classified into lens implement approach and barrier implement approach according to the difference of light splitting technologies. Both of the two methods use combined images each of which includes vertically alternately arranged image stripes. The image stripes are constituted by a left image and a right image with parallax therebetween and produce a stereoscopic display by means of a light splitting device such as a lens array or a parallax barrier array (both also referred to grating).

Figure 5:
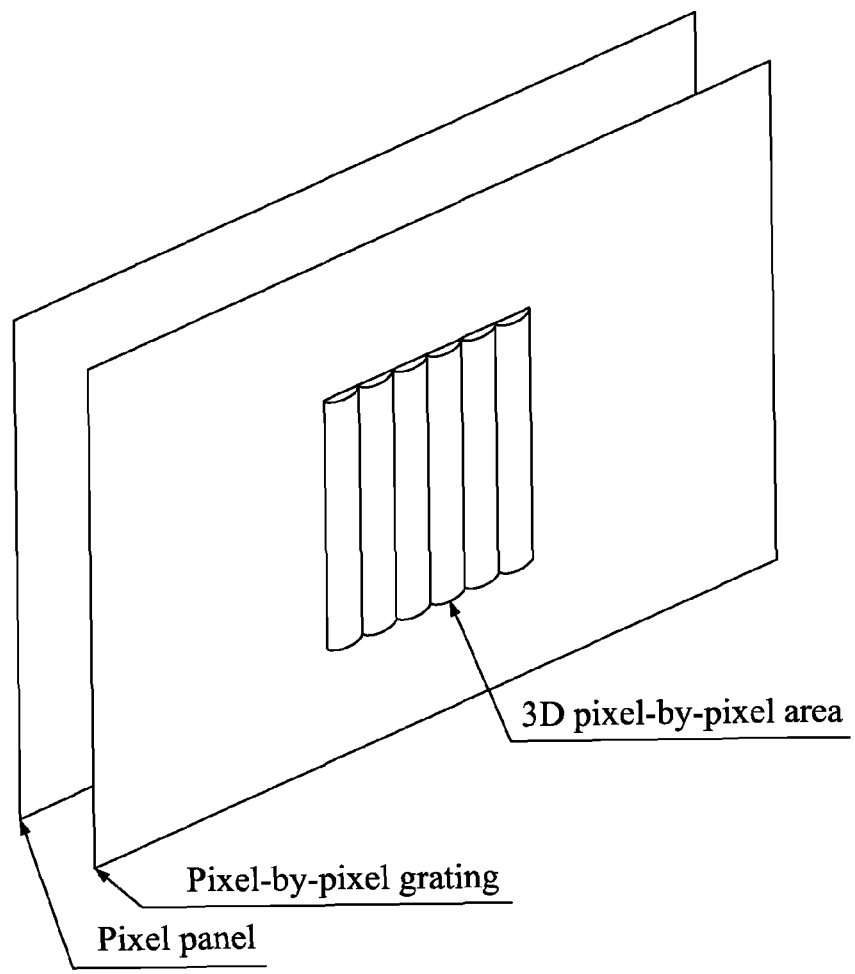
FIG. 5 is a schematic view of a 3D grating area according to an exemplary embodiment of the present invention.
Figure 6A:
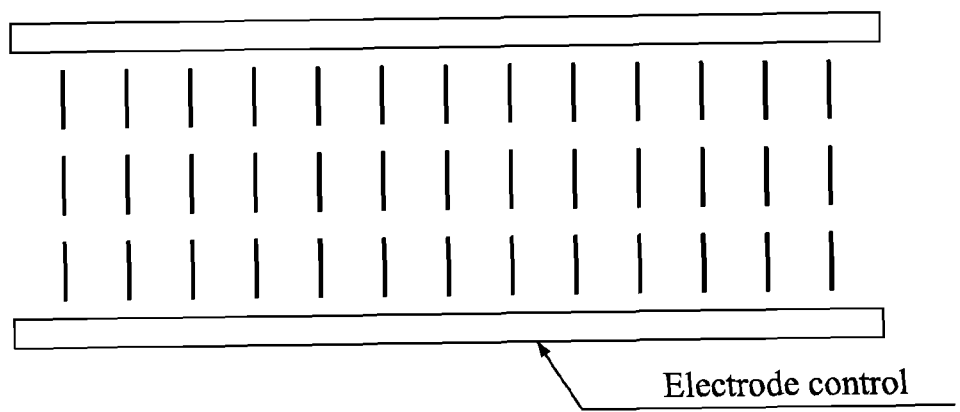
FIG. 6a is a schematic view of an arrangement of liquid crystal molecules without being rotated in a pixel-by-pixel controlled grating according to an exemplary embodiment of the present invention.
Figure 6B:
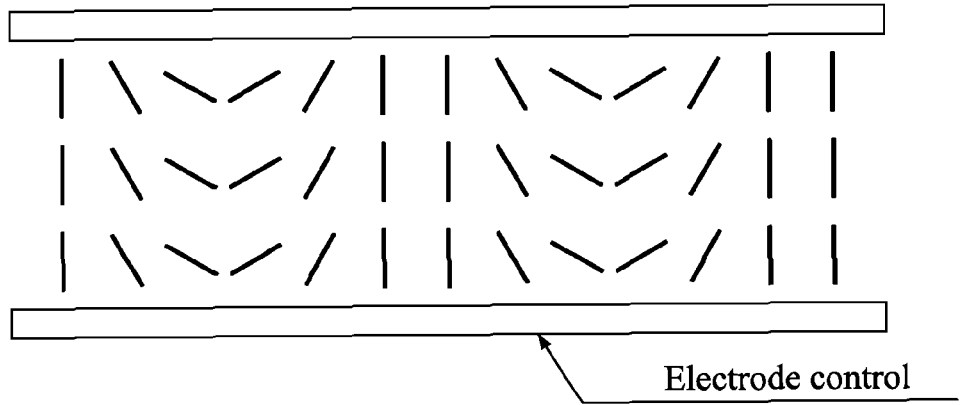
FIG. 6b is a schematic view of an arrangement of liquid crystal molecules being rotated in the pixel-by-pixel controlled grating according to an exemplary embodiment of the present invention.
Figure 7:
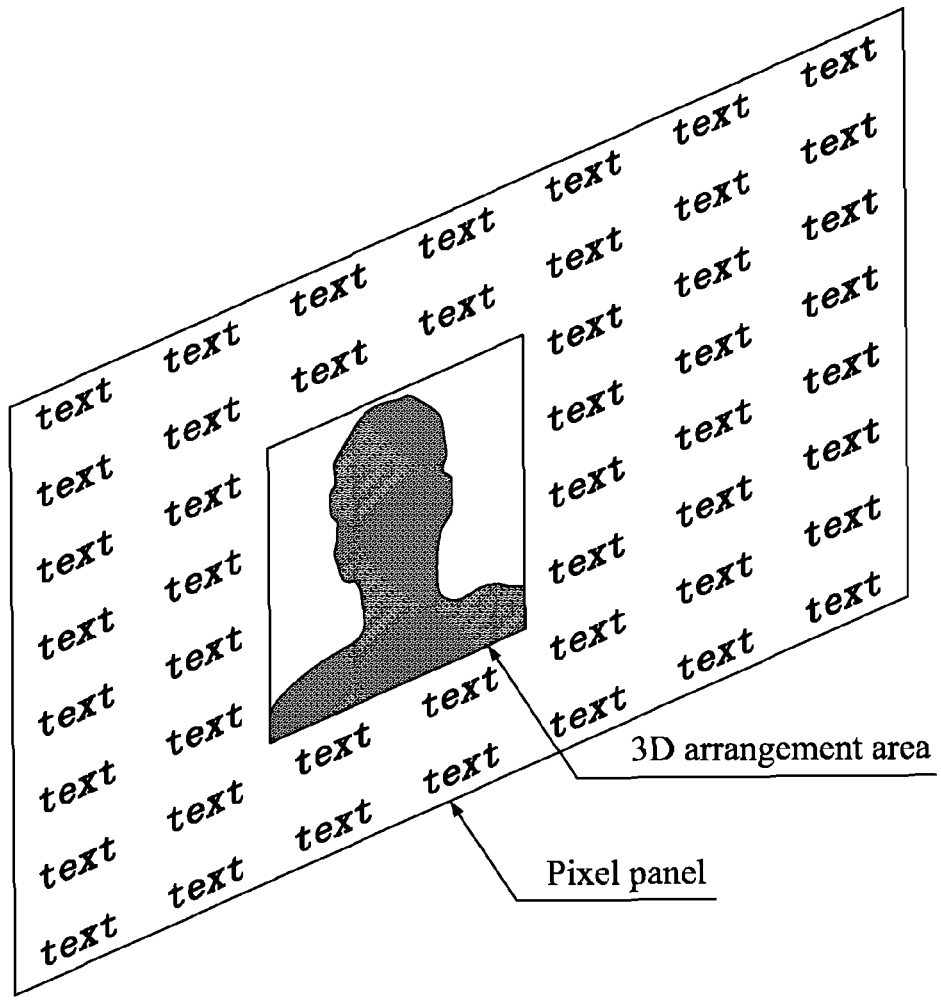
FIG. 7 a schematic view of a 2D display performed in a 3D image area according to an exemplary embodiment of the present invention.
Figure 8:
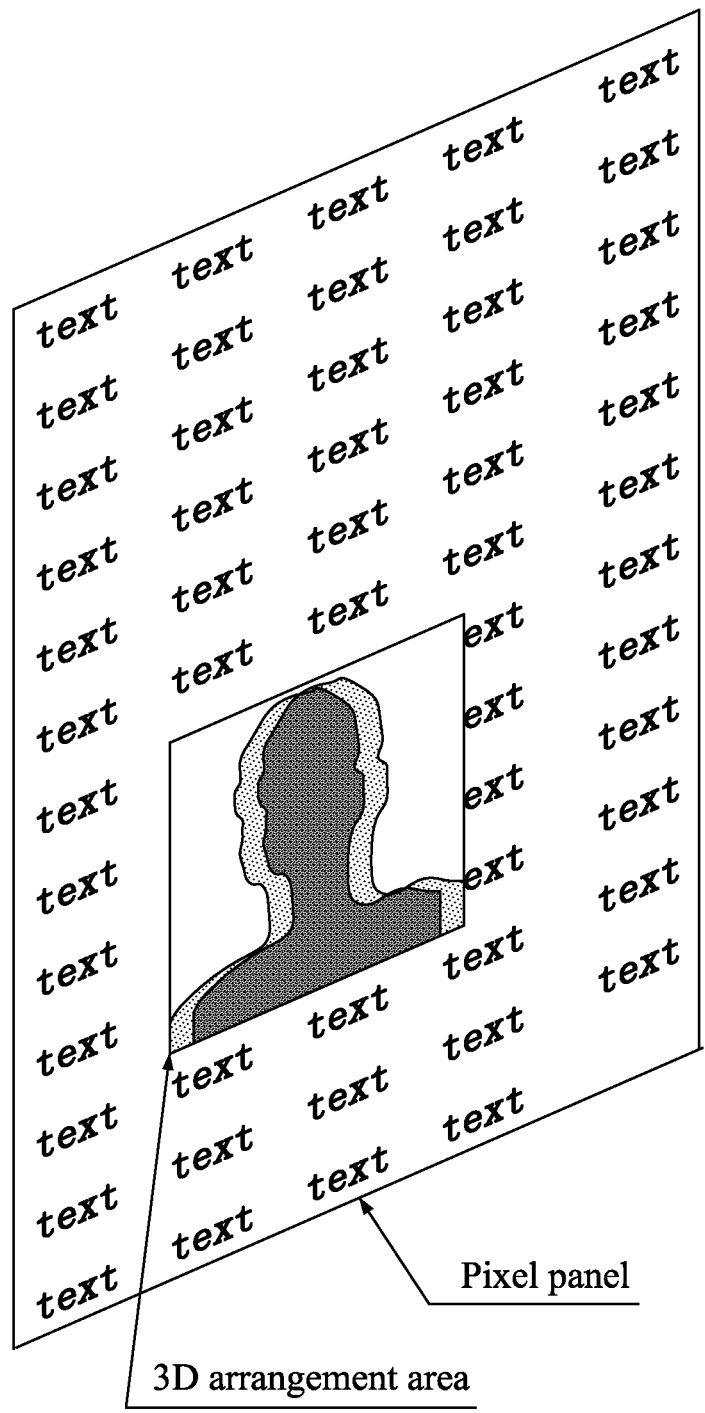
FIG. 8 is a schematic view of a 3D display area after being adjusted when a change of screen aspect ratio occurs according to an exemplary embodiment of the present invention.

In the following embodiments of the present invention, an area on a pixel display panel having alternate images arrangement is referred to as 3D image area, and an area for light splitting under the control of an electrode applied to a light splitting device such as grating or lens array is referred to as 3D grating area. When the 3D image area and the 3D grating area simultaneously coincide with each other and an image constituted by image arrangement units is completely matched with the light splitting device, an effective autostereoscopic effect may be achieved, as shown in FIG. 5.

When the viewer simultaneously watches 2D and 3D image displays on a same liquid crystal display screen, as disclosed by the China patent application No. 201210376026.7, a liquid crystal box including independent pixel-by-pixel control units performs pixel-by-pixel controls on different display areas, and thereby achieving the switching of pixel-by-pixel controls of two-dimensional image and stereo image. When a shape or a position of the 3D display area changes, a continuous and sharp image jitter in the 3D display area occurs, and the 3D display effect is influenced. It is found after the study that this phenomenon occurs primarily resulting from the generation of image based on rendering and the control of grating being by different components and difficult to ensure complete synchronization. For example, if there is a delay of ⅓₀ seconds between the generation of image and the control of grating, the viewer will obviously feel sharp jitter of stereoscopic image, i.e., the pixel arrangement in the 3D display area and the response of hardware control in the 3D display area are not synchronized.

Figure 1:
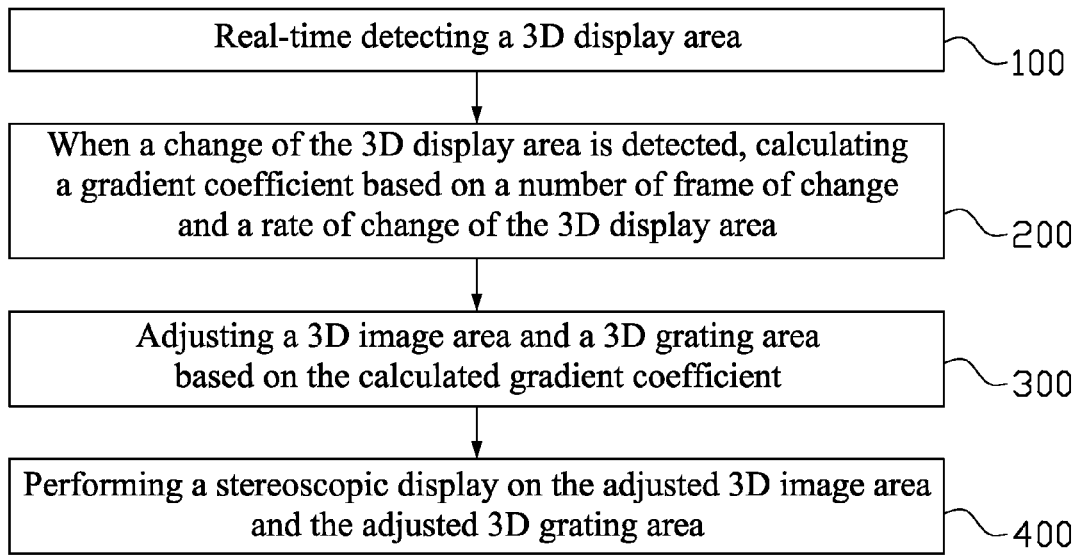
FIG. 1 is a flowchart of a pixel-by-pixel switching method of 2D/3D displaying regionally according to an exemplary embodiment of the present invention.

Accordingly, an exemplary embodiment of the present invention provides a method for 2D/3D switchable displaying. Referring to FIG. 1, the method includes the following steps 100 to 400.

Step 100: real-time detecting a 3D display area.

In the step 100, the 3D display area maybe the whole display screen, also maybe a viewing window in the display screen.

Step 200: when a change of the 3D display area is detected, calculating a gradient coefficient based on the number of image frames of change and a rate of change of the 3D display area.

In the step 200, there are many methods for calculating the gradient coefficient based on the number of image frames and the rate of change of the 3D display area, the selection of calculating methods depends upon actual condition, and the present invention is not limited to any particular method.

The change of the 3D display area comprises rotation of the viewing direction of the display screen; movements, scaling up and down, and pop-up of the windows in the display screen; and drop-down and pop-up menus in the display screen.

When a change of the 3D display area occurs, which includes two processes of starting the change and ending the change, and correspondingly the gradient coefficient has different values.

For example, when the 3D display area starts a change, the gradient coefficient ω1 can be calculated by but not limited to the following expression (1):

$$\omega 1 = \begin{cases} \dfrac{a}{t} + \dfrac{b}{s} & t < T \\ 0 & t \geq T \end{cases} \quad (1)$$

when the 3D display area ends the change, the gradient coefficient ω2 can be calculated by but not limited to the following expression (2):

$$\omega 2 = \begin{cases} \dfrac{a}{T-t} + \dfrac{b}{s} & t < T \\ 1 & t \geq T \end{cases} \quad (2)$$

where t represents the number of sequential image frames for calculating when the 3D display area starts the change or ends the change, and with the increase of the number of sequential image frames when t is in the range of T, the gradient coefficient ω1 gradually decreases while the gradient coefficient ω2 gradually increases, T is a threshold of the number of sequential image frames for calculating, s is a rate of change of the 3D display area, namely the number of moving pixel/frame per unit time of the 3D display area, the larger the s is, the variation of gradient coefficient is greater, whereas the smaller the s is, the variation of gradient coefficient is smaller, and a and b are weighting factors.

The t and T in the above expression (1) may have values respectively same as or different from that of the t and T in the above expression (2).

Step 300: adjusting a 3D image area and a 3D grating area based on the calculated gradient coefficient.

In the step 300, generally, the 3D image area and the 3D grating area have the same size.

Figure 2:
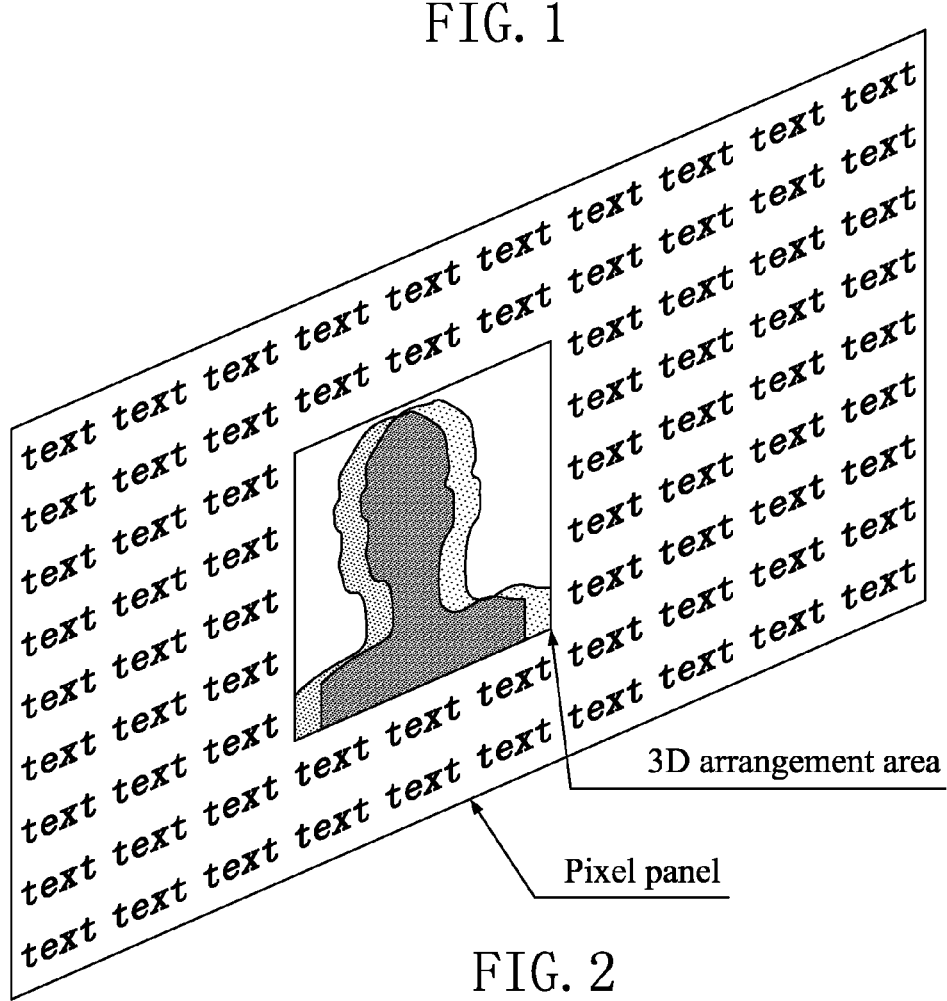
FIG. 2 is a schematic view of two viewing images of which color weights are adjusted based on a gradient coefficient according to an exemplary embodiment of the present invention.

In the step 300, in order to better achieve the objective of the present invention, a color intensity between viewing images can be changed/adjusted by use of the calculated gradient coefficient, that is, a color of one of the viewing images is maintained unchanged, and a color of the other of the viewing images is multiplied by the calculated gradient coefficient. FIG. 2 shows information of two viewing images after being changed/adjusted with color intensity. As shown in FIG. 2, after the color intensity is changed, the color intensity of the viewing image on the left side is greater than that of the viewing image on the right side.

When the 3D display area starts the change, the gradient coefficient may be set to be 0, and when the 3D display area ends the change, the gradient coefficient may be set to be 1. Correspondingly, when the 3D display area starts the change, the 3D display area is switched to be 2D (two-dimensional) display, and when the 3D display area ends the change, the 3D display area is switched to be 3D (three-dimensional) display. Conventionally, the process of switching from 3D display to 2D display, or the process of switching from 2D display to 3D display is stiff.

After adopting the embodiment of the present invention, which not only can solve the problem of continuous and sharp image jitter in the 3D display area during the process of change, but also makes the process of switching be gentle and thereby achieving better user experience.

Figure 3:
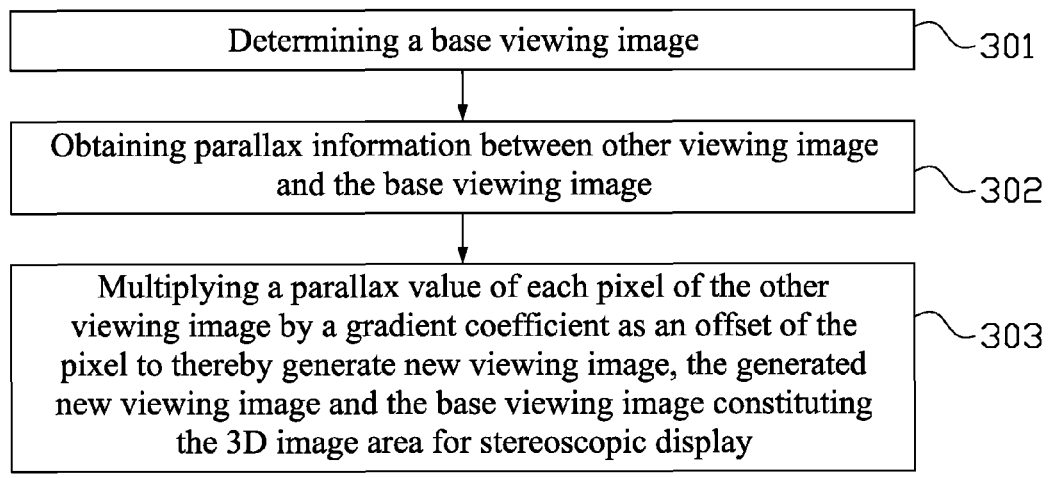
FIG. 3 is a flowchart of varying a parallax between viewing images according to an exemplary embodiment of the present invention.

In the step 300, in order to better achieve the objective of the present invention, for example, when it is switched from 3D display to 2D display, parallaxes between viewing images are made to be gradually decreased and finally comes to one viewing image; and when it is switched from 2D display to 3D display, parallaxes between viewing images are made to be gradually increased and finally returns back to original states of the viewing images, i.e., normal states. Parallaxes between viewing images may be changed/adjusted by use of the calculated gradient coefficient. Referring to FIG. 3:

Step 301: determining a base viewing image.

Step 302: obtaining parallax information between other viewing images and the base viewing image.

Specifically, the parallax information can be obtained by but not limited to the following two methods.

[Method 1]

A scene depth map generated by graphics rendering can be obtained by graphics application program interface (API), and then the depth information is converted into parallax information based on a rendering context. The method 1 is relatively straightforward.

[Method 2]

The parallax information between the base viewing image and the other viewing image is calculated by a stereo matching algorithm. The stereo matching algorithm has many different realization methods, an area-based stereo matching algorithm will be taken as an example below to illustrate how to calculate the parallax information.

Figure 4:
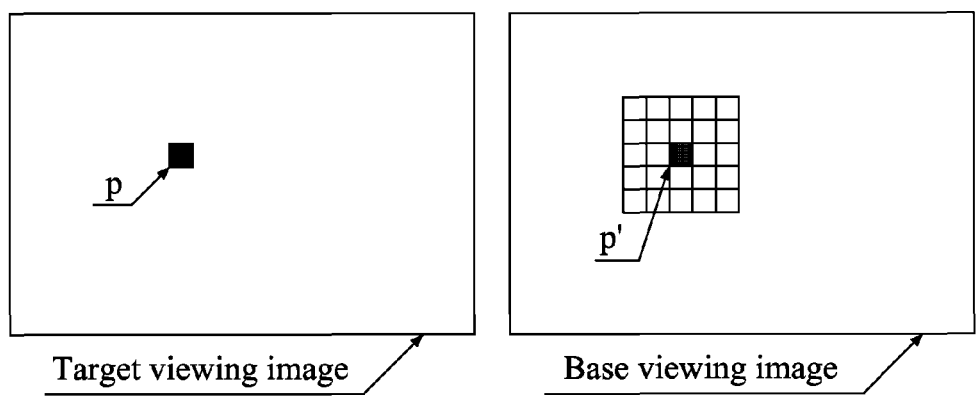
FIG. 4 is a schematic view of obtaining parallax information between other viewing image and a base viewing image according to an exemplary embodiment of the present invention.

Referring to FIG. 4, any one pixel p in a target viewing image and a pixel p' in the base viewing image having a same position as the pixel p are denoted, the purpose of stereo matching is to find out a pixel in a certain range centered by the pixel p' in the base viewing image and having a color closest to that of the pixel p, record the displacement of the found pixel with respect to the pixel p', and finally form a parallax information table or parallax graph, a mathematical expression is as below:

$$D(p) = \underset{d}{\operatorname{argmin}}(|I(p) - I'(p' + d)|) \quad (3)$$

$$d = p'_N - p' \quad (4)$$

where D is parallax information of target viewing image, I is a color intensity of each pixel of the target viewing image, I' is a color intensity of a pixel of the base viewing image, $p_N'$ is a pixel in a range centered by the pixel p', and d is a displacement between $p_N'$ and p'.

Step 303: multiplying a parallax value of each pixel of the other viewing image by the gradient coefficient as an offset of the pixel to thereby generate another viewing image, the generated another viewing image and the base viewing image constituting the 3D image area for stereoscopic display.

In the step 303, a pixel color intensity of the generated another viewing image may be maintained the same as that of the base viewing image or different from that of the base viewing image, and the present invention does not give a limit to it.

For example:

when the 3D display area starts a change, the pixel color intensity after being offset is that:

$$I''(p+D(p)(1-\omega_1))=I(p) \quad (5)$$

Or, when the 3D display area ends the change, the pixel color intensity after being offset is that:

$$I''(p+D(p)(1-\omega_2))=I(p) \quad (6)$$

where I'' is a color intensity of the pixel p in the target viewing image after being adjusted.

In the step 300, the determining of 3D grating area is which one of 2D grating and 3D grating can use but not limit to the following method that: when the gradient coefficient is 0, determining the 3D grating area is 2D grating; and when the gradient coefficient is greater than 0, determining the 3D grating area is 3D grating.

A stereoscopic display apparatus using electrically-driven liquid crystal lens is assembled by a 2D flat panel display apparatus with an electrically-driven liquid crystal lens. The electrically-driven liquid crystal lens includes an upper substrate, a lower substrate, multiple strip electrodes formed on the upper substrate, an electrode layer formed on the lower substrate, and a liquid crystal layer arranged between the strip electrodes and the electrode layer. By applying required voltages to the strip electrodes and the electrode layer, an electric field is generated between the upper substrate and the lower substrate, and liquid crystal molecules in the liquid crystal layer then are driven to be deflected. When the strip electrodes are applied with different voltages, liquid crystal molecules corresponding to the strip electrodes with different voltages will have different deflection degrees, which leads to the liquid crystal molecules corresponding to the strip electrodes with different voltages when light rays incident thereon have different refractive indexes, and thereby forming a liquid crystal lens similar to a cylindrical grating, so that light rays incident on the liquid crystal lens would encounter liquid crystal molecules with different refractive index and thereby different refractions are produced, and finally exit out like from a cylindrical grating. Accordingly, by adjusting the applied voltages and electrode distribution of the stereoscopic light splitting device based on received gradient coefficient to make the 3D grating area synchronously coincides with the 3D image area, a stereoscopic viewing effect on the 3D image area can be achieved.

Step 400: performing a stereoscopic display on the adjusted 3D image area and the adjusted 3D grating area.

The embodiments of the present invention does not limit the switching manner of 2D/3D switchable displays, if the user uses a screen rotation as the switching manner, i.e., in the situation of a change of screen aspect ratio being acknowledged by using a gyroscope etc., the gradient coefficient can be used in the process of switching between 2D display and 3D display. For example, before the aspect ratio is changed, the screen displays 3D content, and after the aspect ratio is changed, the screen displays 2D content. During the process of change, the gradient coefficient makes the process of switching be without continuous and sharp image jitter, and thereby a better viewing effect is achieved.

Figure 9:
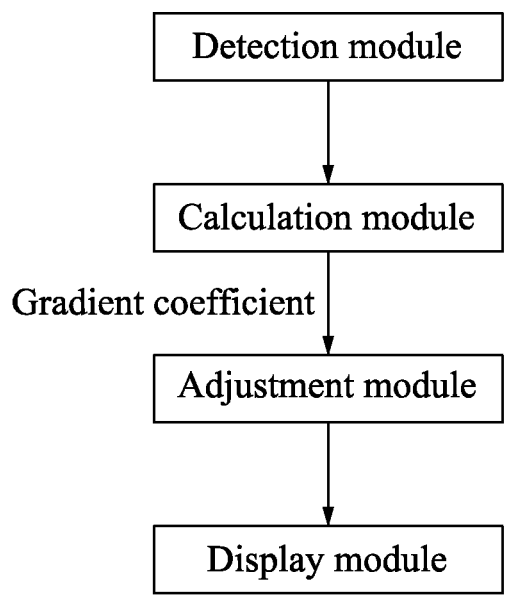
FIG. 9 is a schematic structural view of an apparatus for 2D/3D switchable displaying according to an exemplary embodiment of the present invention.

Referring to FIG. 9, an exemplary embodiment of the present invention further provides an apparatus for 2D/3D switchable displaying. The apparatus at least includes:

a detection module configured (i.e., structured and arranged) to detect a real-time change of a 3D display area;

a calculation module configured to calculate a gradient coefficient based on a number of frame and a rate of change of the 3D display area when a change of the 3D display area is detected;

an adjustment module configured to adjust a 3D image area and a 3D grating area based on the calculated gradient efficient; and a display module configured to perform a stereoscopic display on the adjusted 3D image area and the adjusted 3D grating area.

In an exemplary embodiment, the detection module, the calculation module, the adjustment module and the display module all are software modules stored in a memory and executable by one or more processors of the apparatus for 2D/3D switchable displaying.

The calculation module is specifically configured to:
when the 3D display area starts a change, calculate the gradient coefficient ω1 based on the above expression (1); and
when the 3D display area ends the change, calculate the gradient coefficient ω2 based on the above expression (2);

The adjustment module is specifically configured to:
in each frame of predetermined the number of sequential image frames, adjust a color intensity of viewing images of the 3D image area based on the calculated gradient coefficient; perform an image unit arranging of sub-pixel level to adjusted viewing images; and adjust the 3D grating area based on the calculated gradient coefficient.

Or, the adjustment module is specifically configured to:
in each frame of predetermined the number of sequential image frames, adjust a parallax between viewing images of the 3D image area based on the calculated gradient coefficient; perform an image unit arranging of sub-pixel level to the adjusted viewing images; and adjust the 3D grating area based on the calculated gradient coefficient.

The adjustment module adjusts the parallax between viewing images of the 3D image area includes:
determining a base viewing image;
calculating parallax information between the other viewing image and the base viewing image; and
multiplying a parallax value of each pixel of the other viewing image by the gradient coefficient as an offset of the pixel to thereby generate another viewing image, the generated another viewing image and the base viewing image together constituting the 3D image area for stereoscopic display.

In the above embodiments of the present invention, when the 3D display area starts a change, the 3D display area gradually is switched to be 2D display, and when the 3D display area ends the change, the 3D display area gradually is switched to be 3D display, so that a gradient visual effect can be achieved during the change of the 3D display area, and the problems of viewing image jitter and 3D effect mistake caused by pixel arrangement in the 3D display area and hardware control in the 3D display area being not synchronized can be avoided.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for 2D/3D switchable displaying, comprising:
real-time detecting a 3D display area;
when a change of the 3D display area is detected, calculating a gradient coefficient based on the number of image frames of change and a rate of change of the 3D display area;
adjusting a 3D image area and a 3D grating area based on the calculated gradient coefficient; and
performing a stereoscopic display on the adjusted 3D image area and the adjusted 3D grating area.

2. The method as claimed in claim 1, wherein when the 3D display area starts the change, the gradient coefficient ω1 is that:

$$\omega1 = \begin{cases} \dfrac{a}{t} + \dfrac{b}{s} & t < T \\ 0 & t \geq T \end{cases}$$

where t represents the number of sequential image frames for calculating when the 3D display area starts the change, T is a threshold of the number of sequential image frames for calculating, s is the rate of change of the 3D display area, and a and b are weighting factors; and
when the 3D display area ends the change, the gradient coefficient ω2 is that:

$$\omega2 = \begin{cases} \dfrac{a}{T-t} + \dfrac{b}{s} & t < T \\ 1 & t \geq T \end{cases}$$

where t represents the number of sequential image frames for calculating when the 3D display area ends the change, T is a threshold of the number of sequential image frames of calculating, s is the rate of change of the 3D display area, and a and b are weighting factors.

3. The method as claimed in claim 1, wherein adjusting a 3D image area and a 3D grating area based on the calculated gradient coefficient comprises:
in each frame of predetermined the number of sequential image frames, adjusting a color intensity of viewing images of the 3D image area based on the calculated gradient coefficient; performing an image unit arrangement of sub-pixel level on the adjusted viewing images; and adjusting the 3D grating area based on the calculated gradient coefficient.

4. The method as claimed in claim 3, wherein adjusting a color intensity of viewing images of the 3D image area comprises:
maintaining a color of one of the viewing images unchanged, and multiplying a color of the other of the viewing images by the calculated gradient coefficient.

5. The method as claimed in claim 1, wherein adjusting a 3D image area and a 3D grating area based on the calculated gradient coefficient comprises:
in each frame of preset number of frames, adjusting a parallax between viewing images of the 3D image area based on the calculated gradient coefficient;

performing an image unit arrangement of sub-pixel level on the adjusted viewing images; and adjusting the 3D grating area based on the calculated gradient coefficient.

6. The method as claimed in claim 5, wherein adjusting a parallax between viewing images of the 3D image area comprises:
determining one of the viewing images as a base viewing image;
obtaining parallax information between the other of the viewing images and the base viewing image; and
multiplying parallax value of each pixel of the other of the viewing images by the calculated gradient coefficient as an offset of the pixel to thereby generate new viewing images, the generated new viewing images and the base viewing image constituting the 3D image area for stereoscopic display.

7. The method as claimed in claim 6, wherein obtaining parallax information between the other of the viewing images and the base viewing image comprises:
using a graphics application program interface to obtain a scene depth map, and converting depth information into parallax information based on a rendering context.

8. The method as claimed in claim 6, wherein obtaining parallax information between the other of the viewing images and the base viewing image comprises:
calculating the parallax information between the base viewing image and the other of the viewing images by a stereo matching algorithm.

9. The method as claimed in claim 1, further comprising:
performing a gradual switching between 2D display and 3D display by pixel-to-pixel control.

10. The method as claimed in claim 9, wherein when the 3D display area starts the change, the 3D display area is gradually switched to 2D display; and when the 3D display area ends the change, the 3D display area gradually returns to 3D display.

11. The method as claimed in claim 1, wherein when the change of the 3D display area is detected, calculating different gradient coefficients corresponding to the start of change of the 3D display area and the end of change of the 3D display area, respectively.

12. The method as claimed in claim 2, wherein the gradient coefficients corresponding to the start of change of the 3D display area and the end of change of the 3D display area respectively are different from each other.

13. An apparatus for 2D/3D switchable displaying, at least comprising:
a detection module, configured to detect a real-time change of a 3D display area;
a calculation module, configured to calculate a gradient coefficient based on a number of frame of change and a rate of change of the 3D display area when a change of the 3D display area is detected;
an adjustment module, configured to adjust a 3D image area and a 3D grating area based on the calculated gradient coefficient; and
a display module, configured to perform a stereoscopic display on the adjusted 3D image area and the adjusted 3D grating area.

14. The apparatus as claimed in claim 13, wherein the calculation module is configured to:
when the 3D display area starts the change, calculate the gradient coefficient ω1 according to the expression:

$$\omega 1 = \begin{cases} \dfrac{a}{t} + \dfrac{b}{s} & t < T \\ 0 & t \geq T \end{cases}$$

where t represents a number of frame for calculating when the 3D display area starts the change, T is a threshold of the number of frame, s is a rate of change of the 3D display area, and a and b are weighting factors; and
when the 3D display area ends the change, calculate the gradient coefficient ω2 according to the expression:

$$\omega 2 = \begin{cases} \dfrac{a}{T-t} + \dfrac{b}{s} & t < T \\ 1 & t \geq T \end{cases}$$

where t represents a number of frame for calculating when the 3D display area ends the change, T is a threshold of the number of frame, s is a rate of change of the 3D display area, and a, b are weighting factors.

15. The apparatus as claimed in claim 13, wherein the adjustment module is configured to:
in each frame of preset number of frames, adjust a color intensity of viewing images of the 3D image area based on the calculated gradient coefficient; perform an image unit arrangement of sub-pixel level on the adjusted viewing images; and
adjust the 3D grating area based on the calculated gradient coefficient.

16. The apparatus as claimed in claim 13, wherein the adjustment module is configured to:
in each frame of preset number of frames, adjust a parallax between viewing images of the 3D image area based on the calculated gradient coefficient;
performing an image unit arrangement of sub-pixel level on the adjusted viewing images; and adjusting the 3D grating area based on the calculated gradient coefficient.

17. The apparatus as claimed in claim 16, wherein the adjustment module adjusts the parallax between viewing images of the 3D image area comprises:
determining one of the viewing images as a base viewing image;
obtaining parallax information between the other of the viewing images and the base viewing image; and
multiplying a parallax value of each pixel of the other of the viewing images by the calculated gradient coefficient as an offset of the pixel to thereby generate new viewing images, the generated new viewing images and the base viewing image constituting the 3D image area for stereoscopic display.

18. The apparatus as claimed in claim 13, wherein the 3D display area is gradually switchable between 2D display and 3D display by pixel-to-pixel control.

19. The apparatus as claimed in claim 18, wherein when the 3D display area starts the change, the 3D display area is gradually switched to 2D display; and when the 3D display area ends the change, the 3D display area gradually returns to 3D display.

20. The apparatus as claimed in claim 13, wherein when the change of the 3D display area is detected, the calculation module calculates different gradient coefficients corresponding to the start of change of the 3D display area and the end of change of the 3D display area, respectively.

* * * * *